United States Patent [19]

Moberg

[11] Patent Number: 4,546,956
[45] Date of Patent: Oct. 15, 1985

[54] COMPRESSED AIR COUPLING

[75] Inventor: Kurt E. L. Moberg, Skövde, Sweden

[73] Assignee: Karl Ove Nyberg, Skövde, Sweden

[21] Appl. No.: 517,503

[22] Filed: Jul. 25, 1983

[30] Foreign Application Priority Data

Jul. 27, 1982 [SE] Sweden .............................. 8204473

[51] Int. Cl.⁴ .............................................. C11D 7/00
[52] U.S. Cl. .................. 251/149.6; 285/316;
285/377; 251/149
[58] Field of Search ................ 251/149.6; 137/614.03,
137/614.04; 285/DIG. 25, 316, 377

[56] References Cited

U.S. PATENT DOCUMENTS

| | | | |
|---|---|---|---|
| 3,112,767 | 12/1963 | Cator | 285/277 X |
| 3,423,063 | 1/1969 | German | 251/149.6 |
| 3,613,726 | 10/1971 | Torres | 137/614.03 |
| 3,791,411 | 2/1974 | Bogeskov et al. | 251/149.6 X |
| 4,060,219 | 11/1977 | Crawford | 251/149.6 |
| 4,437,647 | 3/1984 | Cruse | 285/DIG. 25 |

FOREIGN PATENT DOCUMENTS

| | | | |
|---|---|---|---|
| 227729 | 4/1960 | Australia | 137/614.04 |
| 465439 | 5/1950 | Canada | 137/614.03 |
| 587085 | 5/1932 | Fed. Rep. of Germany | 285/316 |
| 109393 | 9/1964 | Netherlands | 285/316 |
| 7901115 | 7/1982 | Sweden . | |
| 2069083 | 8/1981 | United Kingdom | 251/149.6 |

*Primary Examiner*—Larry Jones
*Assistant Examiner*—Carl D. Price
*Attorney, Agent, or Firm*—Young & Thompson

[57] ABSTRACT

A compressed air coupling with a coupling socket and a valve sleeve displaceable therein and lockable by a catch in the socket, and a nipple insertable into the valve sleeve and lockable by a ball catch in the valve sleeve. The valve sleeve (40) together with the nipple (16) is displaceable from its inner end position, while closing the connecting passage (58,64) to a predetermined intermediate position in which a passage (62,64,54,56) is opened between the nipple locked in the valve sleeve and the free atmosphere to release residual compressed air in the nipple. The intermediate position is determined by a shoulder (82) which is arranged on the socket (10) and interacts with the ball catch (78) of the valve sleeve at the same time as the ball catch locks the nipple (16) to the valve sleeve, the locking of the ball catch against the shoulder (82,84) being dependent on the force which the nipple is subjected to due to residual compressed air in the nipple and being arranged to be released when that compressed air has been depressurized to approximately atmospheric pressure, whereafter the compression spring (46) acting on the valve sleeve is free to displace the valve sleeve and the nipple to the outer end position (FIG. 1) of the valve sleeve, in which position the ball catch (78) of the valve sleeve is free to assume a free position (71) to make it possible to withdraw the depressurized nipple.

1 Claim, 6 Drawing Figures

COMPRESSED AIR COUPLING

The present invention relates to a compressed air coupling which operates with a nipple which can be inserted and locked in a coupling socket.

The background of the invention is that conventional quick couplings for compressed air can nomally not be used for larger hose diameters than ½", since in quick couplings known up to now the nipple recoils to a greater or lesser extent when uncoupled, and this recoil can present considerable risks when large couplings are used.

The purpose of the present invention is therefore to achieve a quick coupling of the type in question which when uncoupled is designed so that the nipple cannot be separated from the coupling socket before the air connection has been broken and the air pressure in the nipple has been lowered to a level so that the nipple cannot be thrown back when completely released from the socket. A further purpose of the invention is to achieve a quick coupling of this type which can be coupled using relatively little force on the nipple despite a relatively large counterpressure in the line to the coupling socket.

According to the invention, the nipple is inserted in two steps. In the first step, it reaches an intermediate position where it is locked to the valve sleeve. In a second step, it is pressed in together with the valve sleeve to an inner end position while opening the air connection between the socket and the nipple. Disengagement is also done in two steps. In the first step to the intermediate position, the air connection is cut off and a depressurization conduit is opened from the nipple to the surrounding atmosphere, whereby the pressure in the nipple and the hose or pipe connected thereto drops to approximately atmospheric pressure. Only then is the nipple free to be extracted in a second step from the socket, thus eliminating the risk of recoil.

Due to the special arrangement according to the invention, the engagement and disengagement force will be essentially independent of the air pressure and is primarily determined by a relatively weak compression spring and the frictional resistance from sealing packings.

These and other characteristic features and advantages of the invention will be described in more detail in the description below of an embodiment shown in the accompanying drawings as an example of a compressed air coupling according to the invention.

Figure 1:
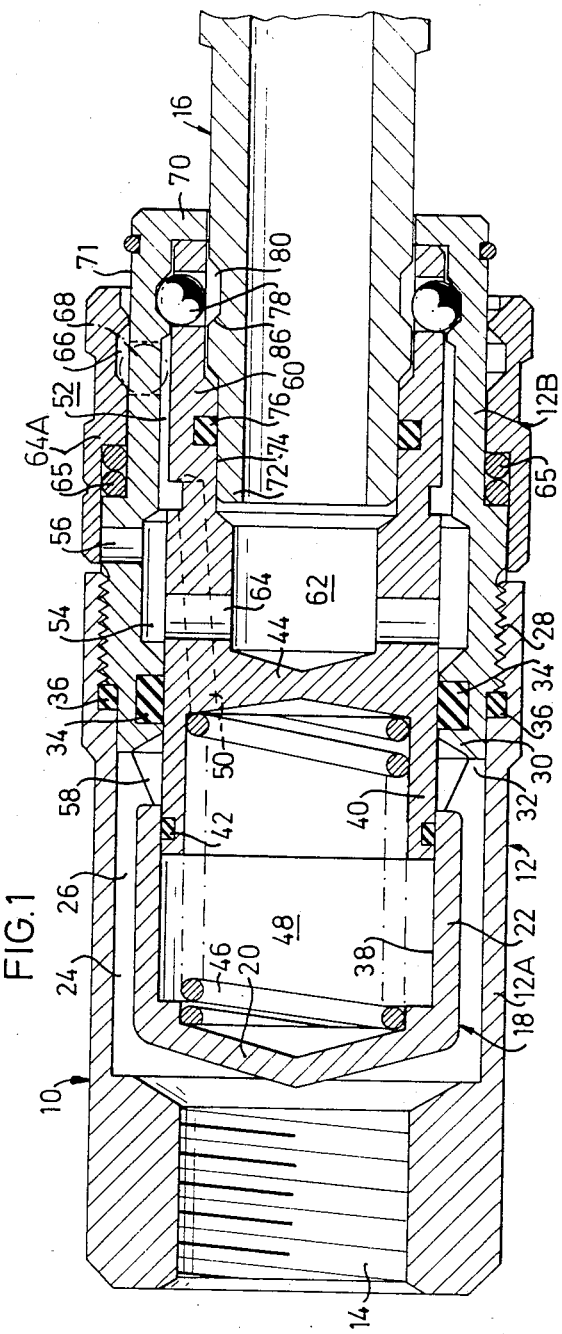
FIG. 1 is a longitudinal section through the coupling socket and nipple in an outer end position.

The coupling socket 10 consists of an outer sleeve which is composed of two sleeves 12A, 12B screwed together. The sleeve 12 has a connector end 14 for a compressed air line from which compressed air is to be supplied to a nipple 16 and a line connected thereto.

A cylindrical cup 18 is inserted in the outer sleeve 12 with its bottom 20 towards the end 14. The lateral surface 22 of the cup is provided with axial flanges 24, which center the cup in the sleeve 12A and form axial air ducts 26 between the cup and the sleeve 12A.

The cup is held in position by screwing the sleeve 12B into the sleeve 12A by means of a thread 28 so that its end 30 presses against the forward ends 32 of the flanges 24.

At the rear end of the sleeve 12B there is an internal packing 34 in the form of an elastic sealing ring or two such rings. Externally, the sleeve 12B is sealed with a packing 36 against the sleeve 12A.

In the internal cylindrical bore 38 of the cup, there is axially displaceable the inner end of a valve sleeve 40 which seals against the cup by means of a packing 42.

The valve sleeve has an intermediate wall 44. Between said wall and the bottom of the cup there is a compression spring 46.

Figure 2:
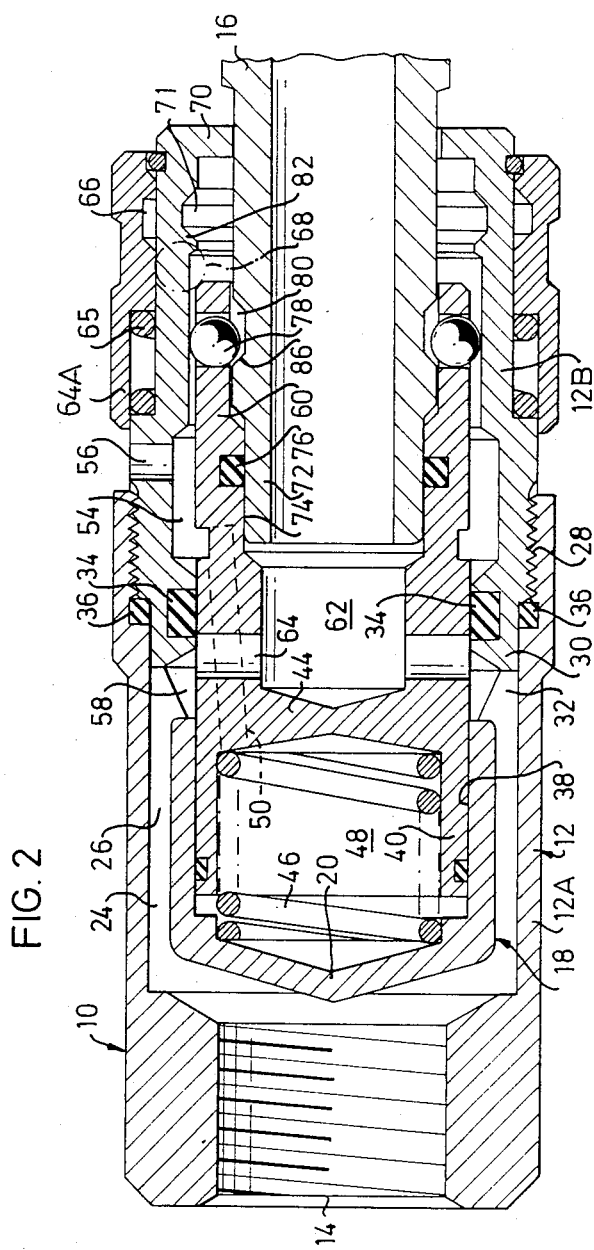
FIG. 2 shows the nipple and the valve sleeve in a completely coupled inner end position.

The chamber 48 formed between the bottom 20 and the intermediate wall 44 has a variable volume by virtue of the fact that the valve sleeve 40 can be displaced from the outer end position shown in FIG. 1 to the inner end position shown in FIG. 2. However, the chamber 48 is always in communication with the surrounding atmosphere via an air channel 50 which opens into a groove 52, which is in turn in communication with an internal groove 54 in the sleeve 12B. One or more holes 56 in the sleeve 12B lead from this groove to the surrounding atmosphere.

Inlet air is led under pressure into a region 58 between the packing 42 and the packing 34. The radius to the sealing surface on the inside of the cup 18 is equal to the radius to the sealing surface on the outside of the valve sleeve for the packing 34, which means that the forces from the compressed air in the region 58 will completely counterbalance each other. Thus the valve sleeve 40 will practically be subjected to no axial compressed air forces at all. All that is required to press the nipple 16 and thus the valve sleeve 40 from the outer position shown in FIG. 1 to the inner position shown in FIG. 2 is thus to overcome the relatively weak resistance presented by the spring 46 and the friction of the packings 42, 34. This negligible insertion force thus makes it possible to achieve a quick and easy coupling.

On the other side of the intermediate wall 44, the valve sleeve 40 is made with an externally cylindrical portion 60. Thereinside there is a bottom chamber 62 which is in communication via radial conduits 64 with the groove 54 in the outer position of the valve sleeve according to FIG. 1 for depressurizing the nipple. In the inner position according to FIG. 2, the conduits 64 in the valve sleeve are in communication with the region 58 to engage the air communication to the nipple.

Figure 3:
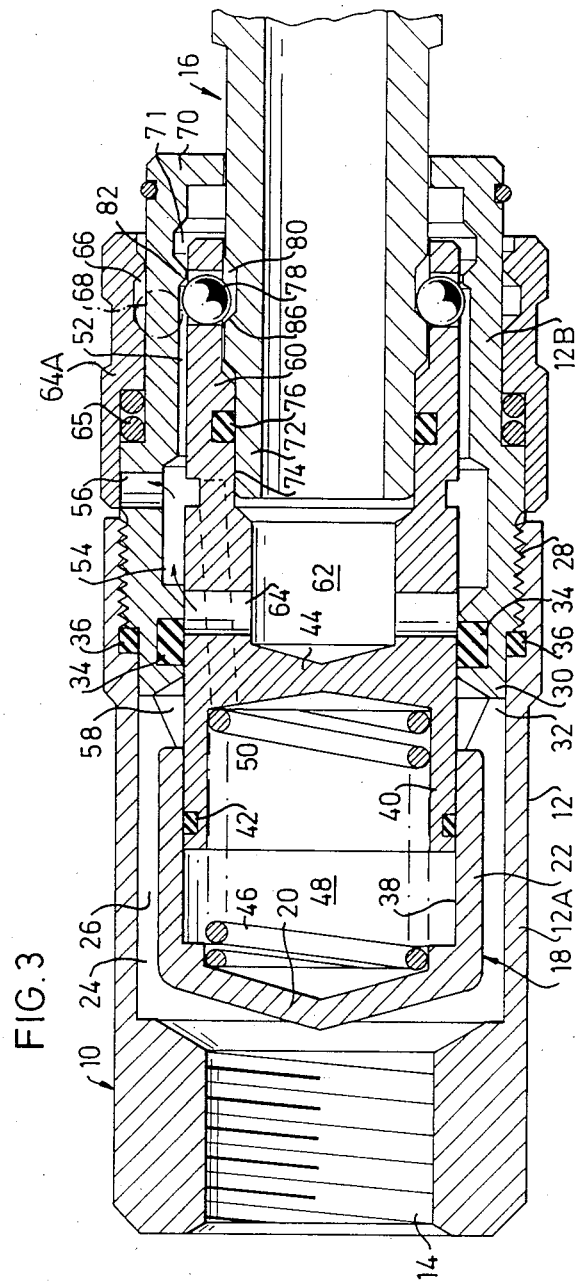
FIG. 3 shows a nipple and a valve sleeve in an intermediate position.

On the outside of the sleeve 12, a lock collar 64A can be displaced in a known manner from its outer position according to FIG. 2 to its inner position according to FIG. 1 against the effect of a compression spring 65. The lock collar has an internal groove 66 to receive catch balls 68 forming a ball catch which is known per se and which are mounted in holes in the sleeve 12B. In FIGS. 1–3, the balls 68 and their holes have been indicated with dashed lines, since they do not lie in the same axial plane as the balls 78 and their holes.

In FIG 2, the balls 68 are pressed in radially to a lock position, where they form abutments for the front end of the valve sleeve 40 so that the valve sleeve is retained in its inner end position. In FIG. 1, the balls 68 are pressed out radially by the valve sleeve to a free position in the groove 66 when the valve sleeve is in its outer end position and abuts against the stop formed by an inwardly directed edge 70 at the front end of the sleeve 12B.

The nipple 16 has a cylindrical end 72 which when completely inserted into the valve sleeve portion 60, is held in a bore 74 therein and is sealed by means of a packing 76. The nipple is locked in its inserted position according to FIGS. 2 and 3 by means of catch balls 78, which form a second ball catch and lie in a circle of holes in the outer end portion of the valve sleeve 40, 60.

Figure 4:
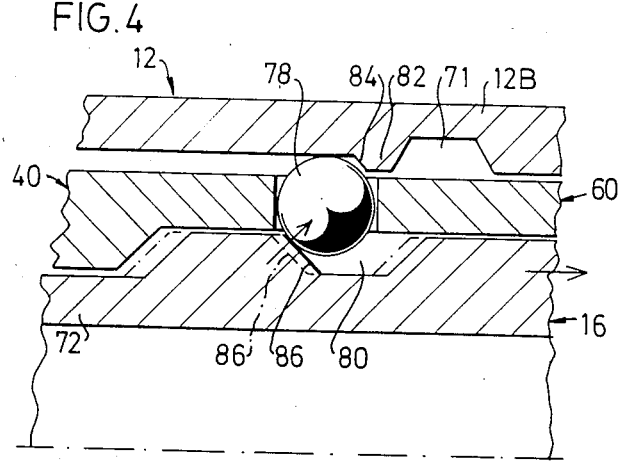
FIGS. 4–6 are enlarged detail drawings of the valve sleeve ball catch in various positions.

In the locked positions shown in FIGS. 2 and 4, the balls 78 interact with one inclined side 86 of a catch groove 80 on the outside of the nipple, whereby the balls 78 are held in the locked position because they are in contact with the cylindrical inside of the sleeve 12B.

Figure 5:
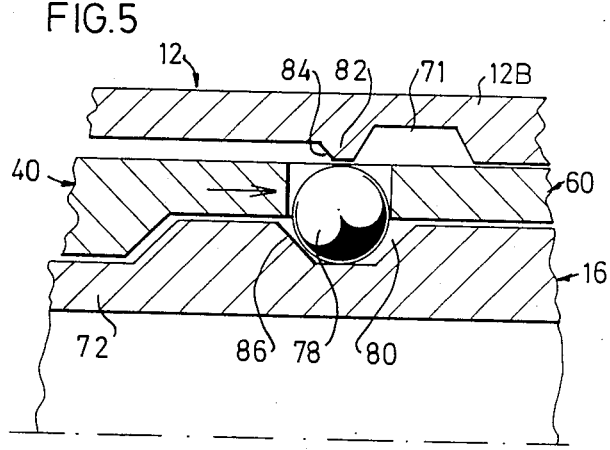
Figure 6:
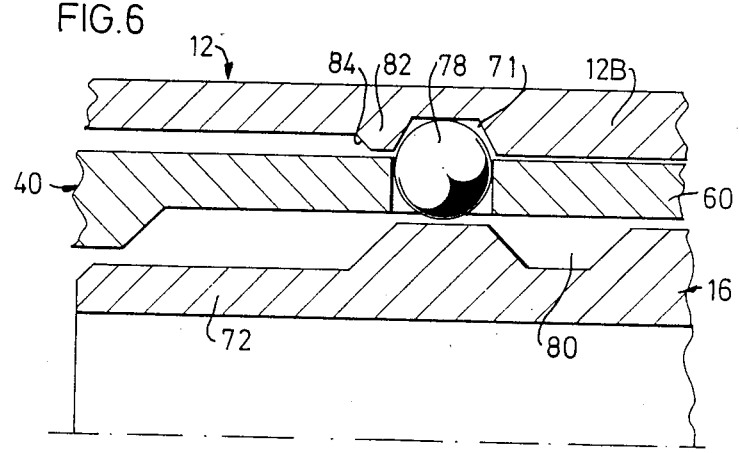

The front end of the valve sleeve 40 is in turn locked by the balls 68 according to FIG. 2, but when this lock is released, by pulling the lock collar 64A backwards to the position shown in FIG. 1, the nipple 16 can be pulled back together with the valve sleeve 40 until the balls 78 strike against the interior shoulder 82 of the sleeve 12B. If there is no overpressure in the nipple then the spring 46 alone will exert a force on the balls 68, and in this case the balls 78 will be forced by the inclined side surface 84 of the shoulder 82 radially inwards into the ball holes so that the balls can pass the shoulder 82 as shown in FIG. 5, and the valve sleeve 40 and the nipple can thus continue to the outer end position of the valve sleeve as shown in FiG. 1, and the nipple 16 can be freely removed as shown in FIG. 6.

If, on the other hand, there is residual pressure in the nipple when the balls 78 strike the inclined side surface 84, the nipple will be pressed by the air pressure in its direction of extraction, so that the inclined side 86 of the groove 80 will press the balls 78 with such force against the surface 84 that the spring 46 cannot overcome this force. This means that in the position according to FIGS. 3 and 4, the nipple 16 cannot be removed before the air pressure in the nipple has been reduced substantially to atmospheric pressure by depressurization through the conduits 64. Only thereafter is the spring 46 able to move the balls 78 to a free position according to FIG. 5 in the groove 80, so that the balls 78 can pass the shoulder 82. The balls 78 can then be pressed radially upwards in the free position in the groove 71 as shown in FIG.6, so that the nipple can be removed. Thus there is no risk of recoil. The nipple and the hose connected thereto are depressurized via the conduits 64, the groove 54 and the holes 56 as shown in FIGS. 3 and 1.

Due to the simple arrangement comprising the shoulder 82, full security is thus achieved: the nipple cannot be disengaged before the pressure in the nipple and its hose has dropped to approximately atmospheric pressure. This completely eliminates the risk of the nipple flying off due to residual air pressure during disengagement.

What I claim is:

1. In a compressed air coupling comprising a socket, a valve sleeve displaceable in the socket, said socket having a compressed air inlet means releasably to lock the sleeve in a first position in the socket, a nipple insertable into the sleeve, a ball catch carried by the sleeve releasably to lock the nipple in the sleeve, means defining a first passage for flow of compressed air from said compressed air inlet through the socket and sleeve and into the nipple in said first position of the sleeve, the sleeve being movable relative to the socket to a second position upon release of said locking means, in said second position said ball catch releases the nipple, and resilient means urging the sleeve in a direction from said first position toward said second position; the improvement in which the sleeve with the nipple locked therein is movable to a position intermediate said first and second positions, said sleeve in said intermediate and said second positions cooperating with a first inner surface portion of said socket to block the first passage to prevent flow of compressed air from said compressed air inlet of said nipple, means defining an open passageway from the interior of the nipple to a region outside the coupling in said intermediate position, the socket having on a second inner surface portion, in the direction the resilient means urges the sleeve, a cylindrical surface followed by a radially inwardly extending shoulder followed by a radially outwardly extending first ball groove, the nipple having on an outer surface a second ball groove having an inclined side surface, said cylindrical surface maintaining said ball catch in said second groove in said first position of the sleeve, said inclined surface camming said ball catch partially out of said second groove and against said shoulder in said intermediate position of said sleeve when compressed air in the nipple forces the nipple in said direction, the sleeve urging the ball catch against said shoulder to cam the ball catch into said second groove in said intermediate position in the absence of compressed air in said nipple thereby to permit said resilient means to move said sleeve to said second position after compressed air in said nipple has been exhausted through said open passageway, and said inclined surface camming said ball catch into said first groove in said second position of the sleeve upon movement of the nipple relative to the sleeve in said direction thereby to permit withdrawal of the nipple from the sleeve.

* * * * *